(12) United States Patent
Graffunder

(10) Patent No.: US 12,175,511 B2
(45) Date of Patent: Dec. 24, 2024

(54) AERIAL MESSAGE JOB DEVICES, SYSTEMS, AND METHODS

(71) Applicant: SmokeOn, LLC, Eau Claire, WI (US)

(72) Inventor: Jody Mark Graffunder, Eau Claire, WI (US)

(73) Assignee: SMOKEON, LLC, Eau Claire, WI (US)

( * ) Notice: Subject to any disclaimer, the term of this patent is extended or adjusted under 35 U.S.C. 154(b) by 188 days.

(21) Appl. No.: 17/985,200

(22) Filed: Nov. 11, 2022

(65) Prior Publication Data

US 2023/0169557 A1    Jun. 1, 2023

Related U.S. Application Data

(60) Provisional application No. 63/284,119, filed on Nov. 30, 2021.

(51) Int. Cl.
*G06Q 30/00* (2023.01)
*G06Q 30/0601* (2023.01)

(52) U.S. Cl.
CPC .............. *G06Q 30/0611* (2013.01)

(58) Field of Classification Search
None
See application file for complete search history.

(56) References Cited

U.S. PATENT DOCUMENTS

| | | | |
|---|---|---|---|
| 5,992,065 A * | 11/1999 | Preiser | G09F 21/06 40/212 |
| 9,805,338 B1 * | 10/2017 | Ghosn | G06Q 30/08 |
| 2002/0194037 A1 | 12/2002 | Creed et al. | |
| 2007/0073610 A1 * | 3/2007 | Marugabandhu | G06Q 40/04 705/37 |
| 2016/0012472 A1 | 1/2016 | Nagaswami | |
| 2016/0267825 A1 | 9/2016 | Stewart | |
| 2017/0200197 A1 | 7/2017 | Brubaker | |
| 2021/0221509 A1 * | 7/2021 | Hiller | B64D 37/02 |
| 2021/0225215 A1 * | 7/2021 | Hiller | G09F 21/06 |

OTHER PUBLICATIONS

International Patent Application No. PCT/US2022/049809, International Search Report and Written Opinion mailed Feb. 21, 2023, 11 pages.

* cited by examiner

*Primary Examiner* — Mila Airapetian
(74) *Attorney, Agent, or Firm* — Fredrikson & Byron, P.A.

(57) ABSTRACT

A method includes the steps of receiving one or more pilot inputs from each of one or more pilots and receiving one or more customer inputs from a customer. The method further includes the step of creating an aerial message job based on the one or more pilot inputs and the one or more customer inputs. And, the method includes the step of providing aerial message job completion data.

17 Claims, 2 Drawing Sheets

AERIAL MESSAGE JOB DEVICES, SYSTEMS, AND METHODS

RELATED APPLICATION

This disclosure claims priority to U.S. provisional patent application No. 63/284,119, filed on Nov. 30, 2021.

TECHNICAL FIELD

This disclosure generally relates to devices, systems, and methods for aerial messaging. Exemplary embodiments described herein include devices, systems, and methods for creating and coordinating an aerial messaging job amongst one or more aircraft and a customer.

BACKGROUND

Skywriting is the process by which one or more aircraft emit a biodegradable vapor trail, or other type of puff, to "write" a message in the sky. The aerial message(s) produced by this process can be seen from the ground from many miles away. As such, skywriting can be used as a means to convey one or more messages to large numbers of people on the ground, for instance as a type of company promotion or advertising.

In some examples, multiple aircraft can be used to create the aerial message. The multiple aircraft can fly in formation to create the aerial message, with each aircraft emitting puffs of vapor or smoke in a defined pattern to form the individual message graphics/characters (e.g., letters, numbers, etc.). Thus, the aerial messages can be "written" or "typed" in the sky using multiple aircraft, with each aircraft contributing a portion of a character or a portion of the message.

There can be significant value in aerial messaging as a promotional or advertising means given the widespread exposure an aerial message can facilitate. However, the popularity of widespread skywriting has been limited by several factors, including difficulty on the part of a customer to find and hire aviators with the necessary skill required to create an aerial message and to find such aviators who can create an aerial message in a cost-effective manner at a desired aerial message location.

SUMMARY

In general, various embodiments relating to aerial messaging devices, systems, and methods are disclosed herein. In particular, certain embodiments are disclosed herein in the context of creating and coordinating an aerial messaging job amongst one or more aircraft and a customer.

Embodiments disclosed herein can be useful, for example, in providing a cost-effective marketplace for selling and hiring aerial message services. These embodiments disclosed herein can receive an aerial message job request from a customer, distribute the aerial message job to a select group of pilots for bid, and allow the customer to select a particular bid for the aerial message job. Such embodiment thus, in turn, can increase the efficiencies and economies of scale associated with aerial messaging and, thereby, help to make aerial messaging more widely available to customers. Embodiments disclosed herein can receive pilot data input(s) from one or more pilots, receive customer data inputs from one or more customers, and use the pilot data input(s) and customer data input(s) to create an aerial message job. Once the aerial message job is created, some additional embodiments can also provide aerial message instructions to each hired pilot for executing the aerial message job. And, some further embodiments can provide aerial message job completion data to the customer and/or pilot(s) for whom the aerial message job was created.

One embodiment includes an aerial message job method. This method embodiment can include the steps of receiving one or more pilot inputs from each of one or more pilots and receiving one or more customer inputs from a customer. The method further includes the step of creating an aerial message job based on the one or more pilot inputs and the one or more customer inputs. And, the method includes the step of providing aerial message job completion data.

Another embodiment includes an aerial message job system. This system embodiment can include an aerial message job module, at least one pilot aerial message job module in communication with the aerial message job module, and a customer aerial message job module in communication with the aerial message job module. The aerial message job module can receive one or more pilot inputs from each of the at least one pilot aerial message job modules, and the aerial message job module can receive one or more customer inputs from the customer aerial message job module. The aerial message job module can include non-transitory computer-executable instructions that, when executed by processing circuitry, cause the processing circuitry to create an aerial message job based on the one or more pilot inputs and the one or more customer inputs.

In a further embodiment of this system, the aerial message job module can include the non-transitory computer-executable instructions such that, when executed by programmable processing circuitry, the non-transitory computer-executable instructions cause the programmable processing circuitry to receive aerial message job completion data, for instance from the at least one pilot aerial message job module and/or from a spotter module, and provide job completion data, for instance to the at least one pilot aerial message job module and/or to the customer aerial message job module.

In a further embodiment of this system, the system can include a spotter module. The spotter module can include a spotter user interface for inputting, at the spotter module, aerial message job completion data. Aerial message job completion data input at the spotter module can include, for example, one or more of (e.g., each of) image data of an aerial message created in the sky by hired pilot(s), a timestamp (e.g., date and/or time) of the image data of the aerial message created in the sky by the hired pilot(s), and a location of the image data of the aerial message created in the sky by the hired pilot(s). The spotter module can also include a transmitter configured to convey the input aerial message job completion data to the aerial message job module.

An additional embodiment includes aerial message job non-transitory computer-executable instructions that, when executed by programmable processing circuitry, cause the programmable processing circuitry to receive one or more pilot inputs from each of one or more pilots, and receive one or more customer inputs from a customer. The non-transitory computer-executable instructions can further, when executed by the programmable processing circuitry, cause the programmable processing circuitry to create an aerial message job based on the one or more pilot inputs and the one or more customer inputs. In a further embodiment, the non-transitory computer-executable instructions can, when executed by the programmable processing circuitry, cause the programmable processing circuitry to provide aerial message job completion data.

A further embodiment includes a method. This method includes receiving customer input from at least one aerial message job customer, where the received customer input includes a requested aerial message job location at which an aerial message is to be created. This method also includes receiving pilot input from at least one aerial message pilot, where the received pilot input includes a requested distance within which the at least one aerial message pilot is willing to consider an aerial message job. And this method includes creating an aerial message job using the received customer input and the received pilot input, where creating the aerial message job includes assigning at least one aerial message pilot to the aerial message job to create the aerial message at the requested aerial message job location.

In a further embodiment of this method the received customer input can further include: a requested aerial message job text or graphic; and a requested aerial message job time. And, the received customer input can further include: a preset distance from the requested aerial message job location within which to solicit pilot bids for the aerial message job. For example, receiving the preset distance from the requested aerial message job location within which to solicit pilot bids for the aerial message job could include presenting a prompt, to the at least one aerial message job customer, with information as to a number of available pilots at each of two or more different preset radiuses from the requested aerial message job location.

In a further embodiment of this method, the received pilot input can include: a preset distance from the requested aerial message job location within which the at least one aerial message pilot is willing to consider an aerial message job. As one such example, the received pilot input can further include: a home airport location of the at least one aerial message pilot; a preset radius from the home airport location within which the at least one aerial message pilot is willing to consider an aerial message job; and an aircraft type of an aircraft operated by the at least one aerial message pilot from the home airport location. As another such example, the received pilot input can further include: an aircraft cruising speed of an aircraft operated by the at least one aerial message pilot; and an aircraft fuel burn per unit time associated with the aircraft operated by the at least one aerial message pilot.

In a further embodiment of this method, the received customer input can further include: a preset distance from the requested aerial message job location within which to solicit pilot bids for the aerial message job. Also, the received pilot input can include: a preset distance from the requested aerial message job location within which the at least one aerial message pilot is willing to consider an aerial message job. With this input, assigning the at least one aerial message pilot to the aerial message job to create the aerial message at the requested aerial message job location can include: (i) comparing the preset distance from the requested aerial message job location within which to solicit pilot bids for the aerial message job to the preset distance from the requested aerial message job location within which the at least one aerial message pilot is willing to consider an aerial message job, and (ii) based on the comparison, assigning the aerial message job to at least one aerial message pilot for whom the preset distance from the requested aerial message job location within which the at least one aerial message pilot is willing to consider an aerial message job is equal to or less than the preset distance from the requested aerial message job location within which to solicit pilot bids for the aerial message job.

a further embodiment of this method, the method further includes sending an aerial message job bid solicitation to the at least one aerial message pilot assigned to the aerial message job, where the aerial message job bid solicitation includes at least one of the requested aerial message job location, a requested aerial message job time, and a requested aerial message job text or graphic to be written in the sky. And, in response to sending the aerial message job bid solicitation, receiving, from at least one aerial message pilot, an acceptance of the aerial message job bid solicitation. For example, the aerial message job bid solicitation can further include a cost estimate for the at least one aerial message pilot to execute the aerial message job at the requested aerial message job location. In such an example, the method could further include receiving from at least one aerial message pilot: (i) a home airport location of the at least one aerial message pilot, and (ii) at least one of: an aircraft type of an aircraft operated by the at least one aerial message pilot from the home airport location, an aircraft cruising speed of an aircraft operated by the at least one aerial message pilot, and an aircraft fuel burn per unit time associated with the aircraft operated by the at least one aerial message pilot. And, in this such example, the method could further include generating the cost estimate for executing the aerial message job at the requested aerial message job location using: (i) a distance between the requested aerial message job location and the received home airport location of the at least one aerial message pilot, and (ii) at least one of: an aircraft type of an aircraft operated by the at least one aerial message pilot from the home airport location, an aircraft cruising speed of an aircraft operated by the at least one aerial message pilot, and an aircraft fuel burn per unit time associated with the aircraft operated by the at least one aerial message pilot.

In a further embodiment of this method, the method further includes, in response to the received customer input, receiving a price bid from at least one aerial message pilot for executing the aerial message job at the requested aerial message job location. In response to receiving the price bid from the at least one aerial message pilot, this further method embodiment can include transmitting, to at least one aerial message job customer, (i) the received price bid from the at least one aerial message pilot, and (ii) at least one of: prior aerial message job customer review data for the at least one aerial pilot from whom the price bid was received, a number of aerial message jobs flown by the at least one aerial pilot from whom the price bid was received, and types of aerial message texts or graphics previously executed by the at least one aerial pilot from whom the price bid was received. And, this further method embodiment can include receiving selection input, from the at least one aerial message job customer, of the price bid from the at least one aerial message pilot. For example, this could further include, in response to receiving selection input, from the at least one aerial message job customer, of the price bid from the at least one aerial message pilot: creating the aerial message job using the received customer input and the received pilot input; and sending, to the at least one aerial message pilot assigned to the aerial message job, aerial message job instructions, where the aerial message job instructions include one or more commands for creating the aerial message text or graphic specified by the at least one aerial message job customer at the requested aerial message job location. In one such instance, the aerial message job instructions can further include each of (i) one or more navigation commands corresponding to a specific flight path for the at least one aerial message pilot to navigate in creating the aerial message text or graphic specified by the at least one aerial message job customer at the requested aerial message job location, and (ii) one or more vapor/smoke emission actuation commands corresponding to one or more particular positions along the specific flight path at which the at least one aerial message pilot is to emit vapor/smoke to create the aerial message text or graphic specified by the at least one aerial message job customer at the requested aerial message job location.

In a further embodiment of this method, the method further includes providing, to the at least one aerial message job customer, aerial message job completion data. For example, the aerial message job completion data could include captured image data of an aerial message created by the at least one aerial message pilot and a location of the captured image data. As another alternative or additional example, the method could further include: receiving, from the at least one aerial message pilot assigned to the aerial message job at the requested aerial message job location, the aerial message job completion data, where the aerial message job completion data includes aerial message flight navigational data from the at least one aerial message pilot assigned to the aerial message job at the requested aerial message job location; comparing the aerial message flight navigational data to proposed navigation commands corresponding to a specific flight path for the at least one aerial message pilot to navigate in creating an aerial message text or graphic specified by the at least one aerial message job customer at the requested aerial message job location; and, when the aerial message flight navigational data corresponds to the proposed navigation commands within a first predetermined margin of error, determining that the aerial message job was executed by the at least one aerial message pilot assigned to the aerial message job at the requested aerial message job location in a compliant manner.

An additional embodiment includes a non-transitory computer-readable storage medium comprising instructions that, when executed by one or more programmable processors of a computing device, cause the one or more programmable processors to: receive customer input from at least one aerial message job customer, where the received customer input includes a requested aerial message job location at which an aerial message is to be created; receive pilot input from at least one aerial message pilot, where the received pilot input includes a requested distance within which the at least one aerial message pilot is willing to consider an aerial message job; and create an aerial message job using the received customer input and the received pilot input, where creating the aerial message job includes assigning at least one aerial message pilot to the aerial message job to create the aerial message at the requested aerial message job location.

In a further embodiment of the non-transitory computer-readable storage medium, the received customer input can further include: a requested aerial message job text or graphic; and a requested aerial message job time. And, the received customer input can further include: a preset distance from the requested aerial message job location within which to solicit pilot bids for the aerial message job.

In a further embodiment of the non-transitory computer-readable storage medium, the instructions, when executed by one or more programmable processors of the computing device, further cause the one or more programmable processors to: send an aerial message job bid solicitation to the at least one aerial message pilot assigned to the aerial message job, wherein the aerial message job bid solicitation includes: (i) at least one of the requested aerial message job location, a requested aerial message job time, and a requested aerial message job text or graphic to be written in the sky, and (ii) a cost estimate for the at least one aerial message pilot to execute the aerial message job at the requested aerial message job location; and, in response to sending the aerial message job bid solicitation, receive, from at least one aerial message pilot, an acceptance of the aerial message job bid solicitation.

The details of one or more examples are set forth in the accompanying drawings and the description below. Other features, objects, and advantages will be apparent from the description and drawings.

BRIEF DESCRIPTION OF THE DRAWINGS

The following drawings are illustrative of particular embodiments of the present invention and, therefore, do not limit the scope of the invention. The drawings are intended for use in conjunction with the explanations in the following description. Embodiments of the invention will hereinafter be described in conjunction with the appended drawings, wherein like numerals denote like elements. The features illustrated in the drawings are not necessarily to scale, though embodiments within the scope of the present invention can include one or more of the illustrated features (e.g., each of the illustrated features) at the scale shown.

DETAILED DESCRIPTION

The following detailed description is exemplary in nature and is not intended to limit the scope, applicability, or configuration of the invention in any way. Rather, the following description provides some practical illustrations for implementing embodiments of the present invention. Examples of constructions, materials, and/or dimensions are provided for selected elements. Those skilled in the art will recognize that many of the noted examples have a variety of suitable alternatives.

Figure 1:
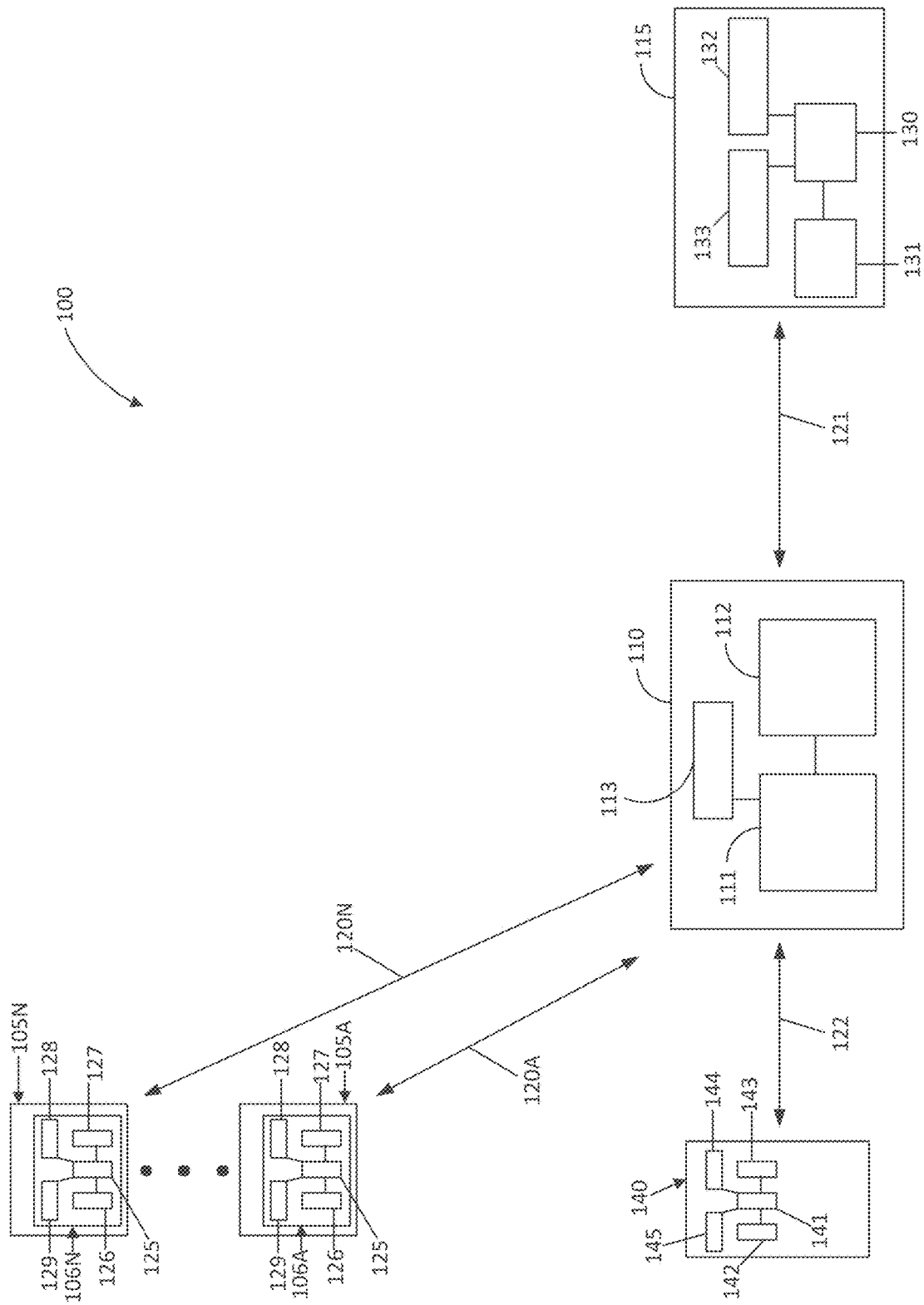
FIG. 1 is a schematic block diagram of an embodiment of an aerial message job system.

FIG. 1 shows an exemplary embodiment of an aerial message job system 100. The system 100 can include one or more aircraft 105A, 105N (referred to generally as "aircraft 105"), a first computing device serving as an aerial message job module 110, and a second computing device serving as a customer aerial message job module 115. Each of the one or more aircraft 105A, 105N can be in communication (e.g., two-way communication) with the aerial message job module 110, and the customer aerial message job module 115 can be in communication (e.g., two-way communication) with the aerial message job module 110. The aerial message job module 110 can receive input from each of the one or more aircraft 105A, 105N and/or transmit data to each of the one or more aircraft 105A, 105N. Likewise, the aerial message job module 110 can receive input from the customer aerial message job module 115 and/or transmit data to the customer aerial message job module 115.

Various embodiments of the system 100 can include various numbers of aircraft 105. In one embodiment, the system 100 can include a single aircraft 105A, while in other embodiments the system 100 can include two or more, such as a plurality of, aircraft 105A-105N. Thus, the illustration of the system 100 at FIG. 1 uses the designation "105N" to convey the variable nature of the number of aircraft 105, such as from one aircraft to a plurality of aircraft, that can be included in the system 100. Each of the aircraft 105A-

105N can be in data communication (e.g., two-way) with the aerial message job module 110.

The aerial message job module 110 can include programmable processing circuitry (e.g., one or more programmable processors) 111, a storage article (e.g., a non-transitory computer-readable storage medium comprising instructions that, when executed by the one or more programmable processors of the aerial message job module computing device, cause the one or more programmable processors to take one or more specified actions) 112 coupled to the processing circuitry 111, and a wireless transceiver 113 coupled to the processing circuitry 111. The storage article 112 can include aerial message job non-transitory computer-executable instructions that, when executed by the processing circuitry 111, cause the aerial message job module 110 to send data to and/or receive data from the aircraft 105 and/or the customer aerial message job module 115. The aerial message job module 110 can be remote from the customer aerial message job module 115 and, in some cases, remote from each of the pilot aerial message job module 106A, 106N. In one example, the aerial message job module 110 can be a remote server. In another example, the aerial message job module 110 can be a mobile computing device that is configured to be deployed at a ground surface below an aerial location where the aerial message is to be created.

Each of the aircraft 105 can include a computing device serving as a pilot aerial message job module 106A, 106N (referred to generally as "pilot aerial message job module 106"). FIG. 1 shows a first pilot aerial message job module 106A at the aircraft 105A and a second pilot aerial message job module 106N at the aircraft 105N. The pilot aerial message job module 106 can, in some embodiments, be a computing device such as a mobile computing device (e.g. a smartphone, tablet, laptop, etc.) that is removably included at the aircraft 105 or an integrated computing device that is integrally coupled at the aircraft 105. Each pilot aerial message job module 106 can be in communication with the aerial message job module 110 via a wireless communication link 120. For example, as shown in FIG. 1, the pilot aerial message job module 106A can be in communication with the aerial message job module 110 via a wireless communication link 120A, and the pilot aerial message job module 106N can be in communication with the aerial message job module 110 via a wireless communication link 120N.

Each pilot aerial message job module 106 can include programmable processing circuitry (e.g., one or more programmable processors) 125, a storage article (e.g., non-transitory computer-readable storage medium comprising instructions that, when executed by the one or more programmable processors of the pilot aerial message job module computing device, cause the one or more programmable processors to take one or more specified actions) 126 coupled to the processing circuitry 125, a location tracking mechanism 127 coupled to the processing circuitry 125, a user interface 128 coupled to the processing circuitry 125, and a wireless transceiver 129 coupled to the processing circuitry 125. The storage article 126 can include pilot non-transitory computer-executable instructions that, when executed by the processing circuitry 125, cause the pilot aerial message job module 106 to send data to and/or receive data from the aerial message job module 110. As one example, the location tracking mechanism 127 can include a global positioning system ("GPS") tracker (e.g., including a GPS transmitter and/or GPS receiver) that is configured to identify a current location of the pilot aerial message job module 106 and, thereby, identify a current location of the aircraft 105 at which the pilot aerial message job module 106 is deployed. The location tracking mechanism 127 can be connected to the processing circuitry 125 to convey aircraft location data to the aerial message job module 110. For instance, the processing circuitry 125 can be configured to cause the pilot aerial message job module 106 (e.g., via the wireless transceiver 129 at the pilot aerial message job module 106) to transmit the current location of the pilot aerial message job module 106, and thus the aircraft 105, to the aerial message job module 110.

The customer aerial message job module 115 can, in some embodiments, be a computing device, such as a mobile computing device (e.g. a smartphone, tablet, laptop, etc.). The customer aerial message job module 115 can be located remote from the location where the aerial message is to be created and, thus, remote of the location where the aerial message job is to be executed. As such, the customer aerial message job module 115 can be located remote from the aircraft 105 and the aerial message job module 110.

The customer aerial message job module 115 can include processing circuitry (e.g., one or more programmable processors) 130, a storage article (e.g., non-transitory computer-readable storage medium comprising instructions that, when executed by the one or more programmable processors of the customer aerial message job module computing device, cause the one or more programmable processors to take one or more specified actions) 131 coupled to the processing circuitry 130, a user interface 132 coupled to the processing circuitry 130, and a wireless transceiver 133 coupled to the processing circuitry 130. The storage article 131 can include customer non-transitory computer-executable instructions that, when executed by the processing circuitry 130, cause the customer aerial message job module 115 to send data to and/or receive data from the aerial message job module 110. The customer aerial message job module 115 can be in communication with the aerial message job module 110 via a wireless communication link 121. For example, the wireless transceiver 133, at the customer aerial message job module 115, can communicate with the wireless transceiver 113, at the aerial message job module 110, over the wireless communication link 121.

In some embodiments of the system 100, the system 100 can further include a spotter module 140. The spotter module 140 can, in some embodiments, be a computing device, such as a mobile computing device (e.g. a smartphone, tablet, laptop, etc.) carried by a designated spotter in the vicinity of (e.g., on the ground below) the location in the sky where the aerial message is created. The spotter module 140 can be distinct from the pilot aerial message job module 106 at the aircraft 105 and the customer aerial message job module 115 and, thus, can be useful to document evidence of the creation of the aerial message, such as in situations where the customer is not able to see the aerial message created in the sky to provide a type of proof of requested job completion to the customer.

The spotter module 140 can include processing circuitry (e.g., one or more programmable processors) 141, a storage article (e.g., non-transitory computer-readable storage medium comprising instructions that, when executed by the one or more programmable processors of the spotter module computing device, cause the one or more programmable processors to take one or more specified actions) 142 coupled to the processing circuitry 141, an imaging device 143 coupled to the processing circuitry 141, a spotter user interface 144 coupled to the processing circuitry 141, and a wireless transceiver 145 coupled to the processing circuitry 141. The storage article 142 can include spotter non-transitory computer-executable instructions that, when executed by the processing circuitry 141, cause the spotter module 140 to send data to and/or receive data from the aerial message job module 110. The spotter module 140 can be in communication with the aerial message job module 110 via a wireless communication link 122. For example, the wireless transceiver 145, at the spotter module 140, can communicate with the wireless transceiver 113, at the aerial message job module 110, over the wireless communication link 122.

The spotter module 140 can be configured to receive aerial job completion data and convey this input aerial message job completion data to the aerial message job module 110. For instance, the imaging device 143 and/or the spotter user interface 144 can be configured to receive aerial message job completion data input at the spotter module 140. As one example, the spotter non-transitory computer-executable instructions can cause the processing circuitry 141 to activate the imaging device 143, for instance as a result of an image capture input provided by the spotter at the spotter user interface 144, to capture image data of an aerial message created in the sky. As additional examples, in addition to captured image data of the aerial message created in the sky one, aerial message job completion data input at the spotter module 140 (e.g., via the spotter user interface 144) can include one or more of (e.g., each of) a timestamp (e.g., date and/or time) of the captured image data of the aerial message and a location of the captured image data of the aerial message. The imaging device 143 and the spotter user interface 144 can be connected to the processing circuitry 141 to convey aerial message job completion data input thereat to the aerial message job module 110. For instance, the processing circuitry 141 can be configured to cause the spotter module 140 (e.g., via the wireless transceiver 145 at the spotter module 140) to transmit the aerial message job completion data input at the spotter module 140 to the aerial message job module 110.

In operation, the aerial message job module 110 can serve as a type of intermediary hub for data exchange that facilitates customer hiring of an aerial message job and/or providing pilot instructions for executing a customer-requested aerial message job.

A customer desiring to hire an aerial message job can provide customer input to the aerial message job module 110. Namely, a customer desiring to hire an aerial message job can input information at the customer aerial message job module 115 (e.g., via the user interface 132). For example, the customer non-transitory computer-executable instructions, when executed by the processing circuitry 130, can be configured to cause the user interface 132 to present a prompt with input fields for inputting one or more of a desired aerial message job text or graphic, a desired aerial message job location, a desired aerial message job date/time, and a preset radius from the desired aerial message job location within which to solicit pilot bids for the aerial message job. Input as to the preset radius from the desired aerial message job location within which to solicit pilot bids for the aerial message job can be useful since the likely cost of the aerial message job would tend to increase the farther a solicited pilot is based but yet tend to decrease as more potential pilots are included within the preset radius from the desired aerial message job location. In certain embodiments, the user interface 132 can present (e.g. with the prompt) information as to the number of available pilots at each of two or more different preset radiuses from the desired aerial message job location. In this way, input of the preset radius from the desired aerial message job location can help a customer improve cost efficiency in soliciting the aerial message job based on the desired aerial message job location and the number of pilots available to execute the aerial message job at each of two or more different preset radiuses from the desired aerial message job location.

This customer input received in response to the prompt at the customer aerial message job module 115 can be transmitted to the aerial message job module 110. In some embodiments, the aerial message job module 110 can store account information (e.g., at the storage article 112) for a plurality of customers and can associate the input received in response to the prompt at the customer aerial message job module 115 with a specific customer account corresponding to the customer from which the input is received. In this way, the aerial message job module 110 can store any of a variety of customer data in association with a corresponding customer account.

The aerial message job module 110 can receive and process the customer input provided in response to the prompt at the customer aerial message job module 115. In particular, the aerial message job module 110 can use the customer input provided in response to the prompt at the customer aerial message job module 115, in addition to pilot input provided in response to a prompt at the pilot aerial message job module 106, to determine which, if any, pilots match the customer input.

For example, the aerial message job module 110 can maintain a pilot database (e.g., at the storage article 112) that includes information pertaining to each of a plurality of pilots. The pilot information in the pilot database at the aerial message job module 110 can be information provided by each pilot using the pilot aerial message job module 106 in response to a pilot information prompt received at the pilot aerial message job module 106 from the aerial message job module 110, such as when the particular pilot is registering or otherwise setting up a pilot account. Information pertaining to each of the plurality of pilots maintained at the aerial message job module 110 can include, for example, a home airport location, a preset radius from the home airport location within which the pilot is willing to consider an aerial message job, aircraft type (e.g., aircraft make and model), aircraft cruising speed, and aircraft fuel burn per unit time (e.g., aircraft fuel burn per hour). When the aerial message job module 110 receives the customer input provided in response to the prompt at the customer aerial message job module 115, the aerial message job module 110 can process this information by cross-referencing with the information in the pilot database to determine which pilot(s) match (e.g., most closely match), the customer input. As one example, the aerial message job module 110 can compare the preset radius from the desired aerial message job location within which to solicit pilot bids for the aerial message job provided at the customer aerial message job module 115 to the preset radius from the home airport location within which the pilot is willing to consider an aerial message job for each pilot included in the database at the storage article 112. Then, the aerial message job module 110 can determine which pilot(s) match the customer input as those pilot(s) for whom the preset radius from the home airport location within which the pilot is willing to consider an aerial message job is equal to or less than the preset radius from the desired aerial message job location within which to solicit pilot bids for the aerial message job provided at the customer aerial message job module 115.

Once the aerial message job module 110 has determined which pilot(s) match the customer input, the aerial message job module 110 can transmit an aerial message job bid solicitation to each pilot determined to match the customer input. Namely, the aerial message job module 110 can transmit the aerial message job bid solicitation to the pilot aerial message job module 106 corresponding to each pilot determined to match the customer input.

The aerial message job bid solicitation received at the pilot aerial message job module 106 can include information relating to the aerial message job requested by the customer aerial message job module 115. For example, the aerial message job bid solicitation received at the pilot aerial message job module 106 can include the requested aerial message job location, the requested aerial message job date/time, and/or the requested aerial message job text or graphic to be written in the sky. In addition, in some examples, the aerial message job bid solicitation received at the pilot aerial message job module 106 can include a cost estimate for executing the requested aerial message job. In particular, the aerial message job module 110 can use the pilot input information as to home airport location, aircraft type (e.g., aircraft make and model), aircraft cruising speed, and aircraft fuel burn per unit time (e.g., aircraft fuel burn per hour) as well as the customer input information as to the requested aerial message job location to calculate a cost estimate for the pilot to execute the requested aerial message job. For instance, the aerial message job module 110 can determine the distance from the home airport location to the requested aerial message job location and apply one or more of the aircraft type, aircraft cruising speed, and aircraft fuel burn per unit time to the determined distance to calculate a cost estimate for executing the requested aerial message job and present this cost estimate to the pilot via the aerial message job bid solicitation received at the pilot aerial message job module 106. This cost estimate, corresponding to the requested aerial message job, provided at the pilot aerial message job module 106 can be useful in helping the pilot to understand an approximate cost of the requested aerial message job in manner tailored to the cost factors specific to that pilot and help that pilot determine a monetary amount to bid as the price charged by that pilot for executing the requested aerial message job.

In addition, the aerial message job bid solicitation received at the pilot aerial message job module 106 can include a bid input prompt. The bid input prompt presented at the pilot aerial message job module 106 (e.g., at the user interface 128) can be configured to receive a price bid, from the pilot corresponding to the particular pilot aerial message job module 106, for executing the customer requested aerial job message. After receiving the price bid in response to the bid input prompt at the pilot aerial message job module 106, the pilot aerial message job module 106 can be configured to transmit the price bid to the aerial message job module 110.

The aerial message job module 110 can be configured to receive the price bid, corresponding to the customer requested aerial job message, from the pilot aerial message job module 106. In response to receiving the price bid from the pilot aerial message job module 106, the aerial message job module 110 can be configured to transmit the price bid to the customer aerial message job module 115 that previously transmitted the requested aerial job message. In some embodiments, in addition to the aerial message job module 110 being configured to transmit the price bid, the aerial message job module 110 can also be configured to transmit other pilot-related information (e.g., along with the price bid) to the customer aerial message job module 115. For example, the aerial message job module 110 can store, at the storage article 112, one or more of prior customer review/feedback/rating of the pilot who submitted the price bid, the number of aerial message jobs flown by the pilot who submitted the price bid, the types of text or graphics that the pilot who submitted the price bid has previously skywritten for prior aerial message jobs, and the geographic area where the pilot who submitted the price bid is based. As such, in addition to the aerial message job module 110 being configured to transmit the price bid, the aerial message job module 110 can also be configured to transmit one or more of prior customer review/feedback/rating of the pilot who submitted the price bid, the number of aerial message jobs flown by the pilot who submitted the price bid, the types of text or graphics that the pilot who submitted the price bid has previously skywritten for prior aerial message jobs, and the geographic area where the pilot who submitted the price bid is based along with the price bid, to the customer aerial message job module 115.

The customer aerial message job module 115 can receive the price bid, and in some cases the additional pilot-related information, from each pilot aerial message job module 106 determined to match the customer input, as described previously, via the aerial message job module 110. The customer aerial message job module 115 can then present at the customer aerial message job module 115 each price bid, and when applicable each of the additional pilot-related information, received from each pilot aerial message job module 106. In response to presenting each such price bid at the customer aerial message job module 115, the customer aerial message job module 115 can receive input (e.g., at the user interface 132) selecting one of the presented price bids.

The customer aerial message job module 115 can then be configured to send a customer price bid selection message to the aerial message job module 110 corresponding to the particular price bid received and selected at the customer aerial message job module 115. In response to receiving the customer price bid selection message from the customer aerial message job module 115, the aerial message job module 110 can be configured to send an aerial message job notification to the pilot aerial message job module 106 that previously submitted the price bid selected by the customer aerial message job module 115. The aerial message job notification received from the customer aerial message job module 115 at the pilot aerial message job module 106 can cause a message to be displayed at the user interface 128 of the pilot aerial message job module 106 notifying the pilot possessing the pilot aerial message job module 106 that the pilot's price bid has been selected for executing a specific customer requested aerial message job.

The aerial message job module 110 can, in some embodiments, be further configured to facilitate payment to the pilot from the customer for executing the customer requested aerial message job. For example, the aerial message job module 110 can request from the customer aerial message job module 115 payment information for the customer requested aerial message job. The aerial message job module 110 can then utilize the payment information received from the customer aerial message job module 115 to cause collection of payment from the customer and remittance of compensation, according to the price bid accepted, to an account corresponding to the pilot aerial message job module 106 that submitted the accepted price bid.

In some embodiments, the aerial message job module 110 can further be configured to send aerial message job instructions to the pilot aerial message job module 106. For instance, the aerial message job module 110 can be configured to send the aerial message job instructions to the pilot aerial message job module 106 after the price bid made by that pilot aerial message job module 106 has been selected by the customer aerial message job module 115.

As one example, the aerial message job instructions can include data for use in executing the customer requested aerial message job. In some embodiments, the aerial message job instructions can include one or more of (e.g., each of) a location (e.g., GPS coordinate) of the customer requested aerial message job to be executed, a flight path for navigating to the location of the customer requested aerial message job, and one or more commands for creating the text or graphic specified by the customer requested aerial message.

The one or more commands for creating the text or graphic specified by the customer requested aerial message can include one or more navigation commands corresponding to a specific flight path for the aircraft 105 to navigate in creating the text or graphic specified by the customer requested aerial message (e.g., using the location tracking mechanism 127 at the pilot aerial message job module 106), a position in a flying formation for the aircraft 105 in cases of multi-aircraft aerial message job execution, and one or more vapor/smoke emission actuation commands (e.g., visually displayed commands) corresponding to particular positions along the specific flight path to be navigated by the aircraft 105 at which the aircraft 105 is to emit vapor/smoke to create the text or graphic specified by the customer requested aerial message. Accordingly, the aerial message job instructions can be sent from the aerial message job module 110 to the pilot aerial message job module 106, and the pilot aerial message job module 106 can execute the aerial message job instructions to display at the pilot aerial message job module 106 (e.g., at the user interface 128) both navigational commands corresponding to a specific flight path for the aircraft 105 to navigate in creating the text or graphic specified by the customer requested aerial message job and one or more vapor/smoke emission actuation commands corresponding to particular positions along the specific flight path to be navigated by the aircraft 105 at which the aircraft 105 is to emit vapor/smoke to create the text or graphic specified by the customer requested aerial message. Thus, the pilot operating the aircraft 105 can navigate the aircraft 105 according to the navigational commands of the aerial message job instructions displayed at the pilot aerial message job module 106, and the pilot operating the aircraft 105 can actuate the release of vapor/from aircraft 105 according to the vapor/smoke emission actuation commands of the aerial message job instructions displayed at the pilot aerial message job module 106.

In some embodiments, multiple aircraft 105 can be utilized to execute the customer requested aerial message job. As one example, the pilot who receives the aerial message job notification at the pilot aerial message job module 106 notifying the pilot that the previously submitted price bid has been selected by the customer can send from the pilot aerial message job module 106 to the aerial message job module 110 a message requesting additional pilots for executing the customer requested aerial message job. After receiving the message requesting additional pilots from the pilot aerial message job module 106, the aerial message job module 110 can be configured to determine proposed additional pilots for executing the customer requested aerial message job. For instance, the aerial message job module 110 can be configured to determine proposed additional pilots for executing the customer requested aerial message job based on those pilots within a preset radius of the location at which the customer requested aerial message job is to be executed, those pilots who have worked with the pilot who's winning price bid was accepted by the customer, and/or those pilots who submitted a price bid for the same customer requested aerial message job.

Once the aerial message job module 110 has determined one or more proposed additional pilots for executing the customer requested aerial message job, the aerial message job module 110 can be configured to send a proposed addition pilot(s) message to the pilot aerial message job module 106 that previously sent the message requesting additional pilots. In response, the pilot aerial message job module 106 can receive input selected one or more of the proposed additional pilots and send an additional pilot selection message back to the aerial message job module 110 with data corresponding to one or more additional pilots to be notified of a request to join in execution of the customer requested aerial message job. Likewise, the aerial message job module 110 can send to the pilot aerial message job module 106 of any such additional pilots the navigation commands corresponding to a specific flight path for that additional pilot's aircraft to navigate in creating the text or graphic specified by the customer requested aerial message, a position in a flying formation for that additional aircraft 105, and one or more vapor/smoke emission actuation commands corresponding to particular positions along the specific flight path to be navigated by that additional pilot's aircraft 105 at which that additional pilot's aircraft 105 is to emit vapor/smoke to create the text or graphic specified by the customer requested aerial message job. As such, the aerial message job module 110 can be configured to facilitate execution of the customer requested aerial message job by transmitting information, to each pilot aerial message job module 106, that is specific to each aircraft's unique navigational and vapor/smoke commands need to create the text or graphic in coordination with one or more other aircraft executing the same aerial message job at the same time.

In embodiments where multiple aircraft 105 are utilized to execute the customer requested aerial message, a timing synchronization cadence can be included as part of the navigation commands sent from the aerial message job module 110 to each of the aircraft 105. In such embodiments, the timing synchronization cadence can be configured to synchronize the navigational commands provided to each aircraft 105 so that the aircraft 105 can collectively execute the customer requested aerial message job via select portions of the job executed by distinct aircraft 105. The use of the timing synchronization cadence as part of the navigation commands sent from the aerial message job module 110 to each of the aircraft 105 can be useful in facilitating the synchronized execution of the customer requested aerial message job without requiring the aircraft 105 (e.g., the pilot aerial message job module 106) to directly communicate with one another during execution of the customer requested aerial message job.

In certain embodiments, the pilot aerial message job module 106 can send aerial message job completion data to the aerial message job module 110. For example, when the customer requested aerial message job is completed, the pilot aerial message job module 106 can send aerial message job completion data in the form of flight navigational data (e.g., generated via the location tracking mechanism 127) to the aerial message job module 110. In one example, the aerial message job module 110 can compare the actual flight navigational data generated via the location tracking mechanism 127 from the pilot aerial message job module 106 to the proposed navigational commands, corresponding to the specific flight path for the aircraft 105 was to navigate in creating the text or graphic specified by the customer requested aerial message, previously sent to the pilot aerial message job module 106. When the aerial message job module 110 determines that the actual flight navigational data generated from the pilot aerial message job module 106 matches the proposed navigational commands, corresponding to the specific flight path for the aircraft 105 was to navigate in creating the text or graphic specified by the customer requested aerial message, previously sent to the pilot aerial message job module 106, within a first predetermined margin of error, then the aerial message job module 110 can determine that the customer requested aerial message job was executed by the aircraft 105 in a compliant manner. On the other hand, when the aerial message job module 110 determines that the actual flight navigational data generated from the pilot aerial message job module 106 diverges from the proposed navigational commands, corresponding to the specific flight path for the aircraft 105 was to navigate in creating the text or graphic specified by the customer requested aerial message, previously sent to the pilot aerial message job module 106, beyond the first predetermined margin of error, then the aerial message job module 110 can determine that the customer requested aerial message job was executed by the aircraft 105 in a non-compliant manner.

In some instances, the aerial message job module 110 can utilize data from the spotter module 140 to verify execution of the customer requested aerial message job, in addition to, or as an alternative to, the aerial message job completion data received from the pilot aerial message job module 106. For instance, the aerial message job module 110 can send a verification request message to the spotter module 140, and, in response, the spotter module 140 can be configured to send a response message to the aerial message job module 110 including aerial job completion data. As one example, the imaging device 143 and/or the spotter user interface 144 can be configured to receive aerial message job completion data input at the spotter module 140. The spotter non-transitory computer-executable instructions can cause the processing circuitry 141 to activate the imaging device 143, for instance as a result of an image capture input provided by the spotter at the spotter user interface 144, to capture image data of an aerial message created in the sky. As additional examples, in addition to captured image data of the aerial message created in the sky one, aerial message job completion data input at the spotter module 140 (e.g., via the spotter user interface 144) can include one or more of (e.g., each of) a timestamp (e.g., date and/or time) of the captured image data of the aerial message and a location of the captured image data of the aerial message. The imaging device 143 and the spotter user interface 144 can be connected to the processing circuitry 141 to convey aerial message job completion data input thereat to the aerial message job module 110. For instance, the processing circuitry 141 can be configured to cause the spotter module 140 (e.g., via the wireless transceiver 145 at the spotter module 140) to transmit the aerial message job completion data input at the spotter module 140 to the aerial message job module 110.

The aerial message job module 110 can receive the aerial message job completion data from the spotter module 140 and use this data to verify execution of the customer requested aerial message job. In one such example, the aerial message job module 110 can compare the actual text or graphic contained in the image data from the spotter module to the text or graphic specified by the customer requested aerial message job. When the aerial message job module 110 determines that the actual text or graphic contained in the image data from the spotter module 140 matches the text or graphic specified by the customer requested aerial message job within a first predetermined margin of error, then the aerial message job module 110 can determine that the customer requested aerial message job was executed by the aircraft 105 in a compliant manner. On the other hand, when the aerial message job module 110 determines that the actual text or graphic contained in the image data from the spotter module 140 diverges from the text or graphic specified by the customer requested aerial message job beyond the first predetermined margin of error, then the aerial message job module 110 can determine that the customer requested aerial message job was executed by the aircraft 105 in a non-compliant manner.

In one specific example, the aerial message job module 110 can determine that the customer requested aerial message job was executed by the aircraft 105 in a compliant manner when both the actual flight navigational data generated from the pilot aerial message job module 106 matches the proposed navigational commands within the first predetermined margin of error and the actual text or graphic contained in the image data from the spotter module 140 matches the text or graphic specified by the customer requested aerial message job within the first predetermined margin of error.

Figure 2:
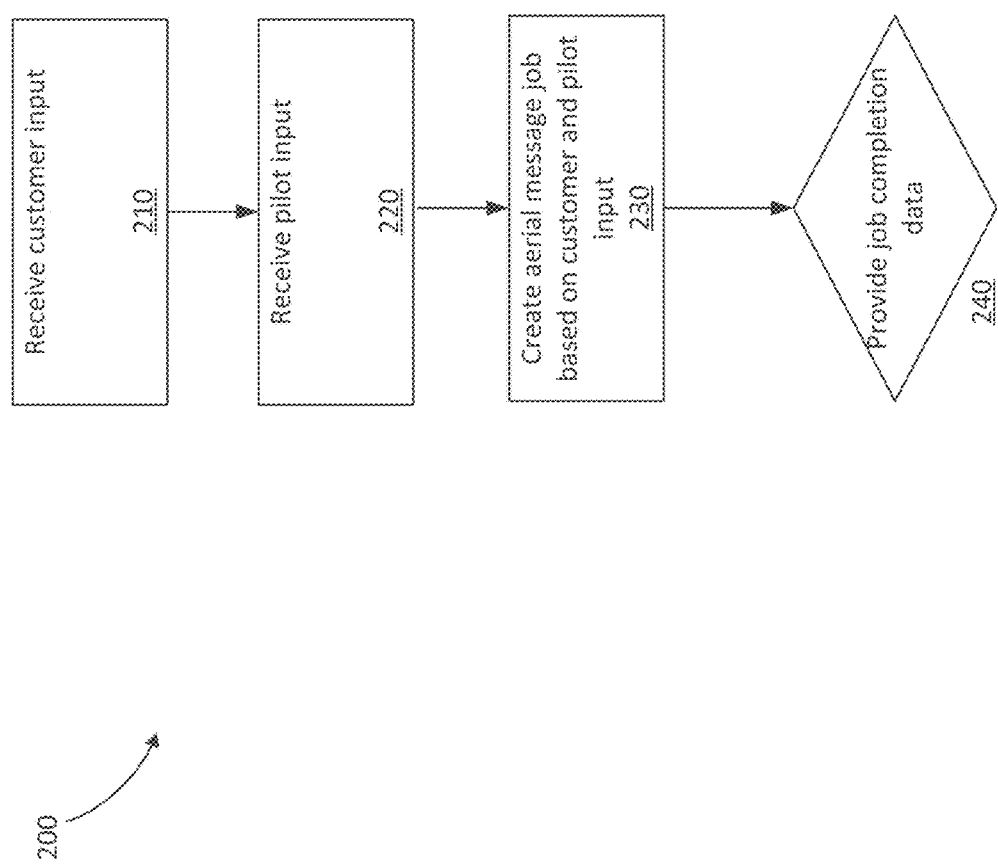
FIG. 2 is a flow diagram of an embodiment of an aerial message job method.

FIG. 2 shows a flow diagram of an embodiment of an aerial message job method 200. The method 200 can, for example, include any one or more of the features described previously herein with respect to the system of FIG. 1.

At step 210, the method 200 includes receiving customer input. For example, the customer input can be received at the customer aerial message job module and sent at the aerial message job module. Received customer input can include, for instance, one or more of a desired aerial message job text or graphic, a desired aerial message job location, a desired aerial message job date/time, and a preset radius from the desired aerial message job location within which to solicit pilot bids for the aerial message job. In some cases, in response to the aerial message job module receiving the customer input, the aerial message job module can associate the received customer input with a specific customer account corresponding to the customer from which the customer input is received.

At step 220, the method 200 includes receiving pilot input. For example, the pilot input can be received at the pilot aerial message job module and sent at the aerial message job module. Received pilot input can include, for instance, one or more of a home airport location, a preset radius from the home airport location within which the pilot is willing to consider an aerial message job, aircraft type (e.g., aircraft make and model), aircraft cruising speed, and aircraft fuel burn per unit time (e.g., aircraft fuel burn per hour). In some cases, in response to the aerial message job module receiving the pilot input, the aerial message job module can associate the received pilot input with a specific pilot account corresponding to the pilot from which the pilot input is received.

At step 230, the method 200 includes creating an aerial message job based on the customer input and the pilot input. For example, as described previously herein, the aerial message job module can use the customer input provided in response to the prompt at the customer aerial message job module and the pilot input provided in response to a prompt at the pilot aerial message job module to determine which, if any, pilots match the customer input. Once the aerial message job module has determined which pilot(s) match the customer input, the aerial message job module can transmit an aerial message job bid solicitation to the pilot aerial message job module corresponding to each pilot determined to match the customer input. In response to the aerial message job bid solicitation, the aerial message job module can be configured to receive a price bid, corresponding to the customer requested aerial job message, from the pilot aerial message job module (as well as from other pilot aerial message job modules corresponding to other pilots determined to match the customer input). In response to receiving the price bid from the pilot aerial message job module, the aerial message job module can be configured to transmit the price bid to the customer aerial message job module that previously transmitted the requested aerial job message, and that customer aerial message job module can be configured to accept the price bid. The customer aerial message job module can then be configured to send a customer price bid selection message to the aerial message job module corresponding to the particular price bid received and selected at the customer aerial message job module. In response to receiving the customer price bid selection message from the customer aerial message job module, the aerial message job module can be configured to send an aerial message job notification to the pilot aerial message job module that previously submitted the price bid selected by the customer aerial message job module. In addition, in creating the aerial message job based on the customer and pilot input, the aerial message job module can send aerial message job instructions to the pilot aerial message job module as part of creating the aerial message job.

At step 240, the method 200 includes providing aerial message job completion data. For example, the pilot aerial message job module can send aerial message job completion data to the aerial message job module, as described previously herein. In addition, the spotter module can send aerial job completion data to the aerial message job module, as described previously herein. The aerial message job module can utilize data from the pilot aerial message job module and/or the spotter module to verify execution of the customer requested aerial message job, and the aerial message job module can determine whether the aerial message job actually executed is in compliance with the customer requested aerial message job.

Various non-limiting exemplary embodiments have been described. It will be appreciated that suitable alternatives are possible without departing from the scope of the examples described herein.

What is claimed is:

1. A method comprising:
   receiving customer input from at least one aerial message job customer, wherein the received customer input includes a requested aerial message job location at which an aerial message is to be created;
   receiving pilot input from at least one aerial message pilot, wherein the received pilot input includes a requested distance within which the at least one aerial message pilot is willing to consider an aerial message job;
   in response to the received customer input, receiving a price bid from at least one aerial message pilot for executing the aerial message job at the requested aerial message job location;
   in response to receiving the price bid from the at least one aerial message pilot, transmitting, to at least one aerial message job customer, (i) the received price bid from the at least one aerial pilot, and (ii) at least one of: prior aerial message job customer review data for the at least one aerial pilot from whom the price bid was received, a number of aerial message jobs flown by the at least one aerial pilot from whom the price bid was received, and types of aerial message texts or graphics previously executed by the at least one aerial pilot from whom the price bid was received;
   receiving selection input, from the at least one aerial message job customer, of the price bid from the at least one aerial message pilot;
   in response to receiving selection input, from the at least one aerial message job customer, of the price bid from the at least one aerial message pilot:
      creating the aerial message job using the received customer input and the received pilot input, wherein creating the aerial message job includes assigning at least one aerial message pilot to the aerial message job to create the aerial message at the requested aerial message job location; and
      sending, to the at least one aerial message pilot assigned to the aerial message job, aerial message job instructions, wherein the aerial message job instructions include one or more commands for creating the aerial message text or graphic specified by the at least one aerial message job customer at the requested aerial message job location, wherein the aerial message job instructions further include each of (i) one or more navigation commands corresponding to a specific flight path for the at least one aerial message pilot to navigate in creating the aerial message text or graphic specified by the at least one aerial message job customer at the requested aerial message job location, and (ii) one or more vapor/smoke emission actuation commands corresponding to one or more particular positions along the specific flight path at which the at least one aerial message pilot is to emit vapor/smoke to create the aerial message text or graphic specified by the at least one aerial message job customer at the requested aerial message job location.

2. The method of claim 1, wherein the received customer input further includes: a requested aerial message job text or graphic; and a requested aerial message job time.

3. The method of claim 2, wherein the received customer input further includes: a preset distance from the requested aerial message job location within which to solicit pilot bids for the aerial message job.

4. The method of claim 3, wherein receiving the preset distance from the requested aerial message job location within which to solicit pilot bids for the aerial message job includes presenting a prompt, to the at least one aerial message job customer, with information as to a number of available pilots at each of two or more different preset radiuses from the requested aerial message job location.

5. The method of claim 1, wherein the received pilot input includes: a preset distance from the requested aerial message job location within which the at least one aerial message pilot is willing to consider an aerial message job.

6. The method of claim 5, wherein the received pilot input further includes: a home airport location of the at least one aerial message pilot; a preset radius from the home airport location within which the at least one aerial message pilot is willing to consider an aerial message job; and an aircraft type of an aircraft operated by the at least one aerial message pilot from the home airport location.

7. The method of claim 5, wherein the received pilot input further includes: an aircraft cruising speed of an aircraft operated by the at least one aerial message pilot; and an aircraft fuel burn per unit time associated with the aircraft operated by the at least one aerial message pilot.

8. The method of claim 1,
wherein the received customer input further includes: a preset distance from the requested aerial message job location within which to solicit pilot bids for the aerial message job,
wherein the received pilot input includes: a preset distance from the requested aerial message job location within which the at least one aerial message pilot is willing to consider an aerial message job, and
wherein assigning the at least one aerial message pilot to the aerial message job to create the aerial message at the requested aerial message job location includes: (i) comparing the preset distance from the requested aerial message job location within which to solicit pilot bids for the aerial message job to the preset distance from the requested aerial message job location within which the at least one aerial message pilot is willing to consider an aerial message job, and (ii) based on the comparison, assigning the aerial message job to at least one aerial message pilot for whom the preset distance from the requested aerial message job location within which the at least one aerial message pilot is willing to consider an aerial message job is equal to or less than the preset distance from the requested aerial message job location within which to solicit pilot bids for the aerial message job.

9. The method of claim 1, further comprising:
sending an aerial message job bid solicitation to the at least one aerial message pilot assigned to the aerial message job, wherein the aerial message job bid solicitation includes at least one of the requested aerial message job location, a requested aerial message job time, and a requested aerial message job text or graphic to be written in the sky; and
in response to sending the aerial message job bid solicitation, receiving, from at least one aerial message pilot, an acceptance of the aerial message job bid solicitation.

10. The method of claim 9, wherein the aerial message job bid solicitation further includes a cost estimate for the at least one aerial message pilot to execute the aerial message job at the requested aerial message job location.

11. The method of claim 10, further comprising:
receiving from at least one aerial message pilot: (i) a home airport location of the at least one aerial message pilot, and (ii) at least one of: an aircraft type of an aircraft operated by the at least one aerial message pilot from the home airport location, an aircraft cruising speed of an aircraft operated by the at least one aerial message pilot, and an aircraft fuel burn per unit time associated with the aircraft operated by the at least one aerial message pilot; and
generating the cost estimate for executing the aerial message job at the requested aerial message job location using: (i) a distance between the requested aerial message job location and the received home airport location of the at least one aerial message pilot, and (ii) at least one of: an aircraft type of an aircraft operated by the at least one aerial message pilot from the home airport location, an aircraft cruising speed of an aircraft operated by the at least one aerial message pilot, and an aircraft fuel burn per unit time associated with the aircraft operated by the at least one aerial message pilot.

12. The method of claim 1, further comprising:
providing, to the at least one aerial message job customer, aerial message job completion data.

13. The method of claim 12, wherein the aerial message job completion data includes captured image data of an aerial message created by the at least one aerial message pilot and a location of the captured image data.

14. The method of claim 12, further comprising:
receiving, from the at least one aerial message pilot assigned to the aerial message job at the requested aerial message job location, the aerial message job completion data, wherein the aerial message job completion data includes aerial message flight navigational data from the at least one aerial message pilot assigned to the aerial message job at the requested aerial message job location;
comparing the aerial message flight navigational data to proposed navigation commands corresponding to a specific flight path for the at least one aerial message pilot to navigate in creating an aerial message text or graphic specified by the at least one aerial message job customer at the requested aerial message job location; and
when the aerial message flight navigational data corresponds to the proposed navigation commands within a first predetermined margin of error, determining that the aerial message job was executed by the at least one aerial message pilot assigned to the aerial message job at the requested aerial message job location in a compliant manner.

15. A non-transitory computer-readable storage medium comprising instructions that, when executed by one or more programmable processors of a computing device, cause the one or more programmable processors to:
receive customer input from at least one aerial message job customer, wherein the received customer input includes a requested aerial message job location at which an aerial message is to be created;
receive pilot input from at least one aerial message pilot, wherein the received pilot input includes a requested distance within which the at least one aerial message pilot is willing to consider an aerial message job;
create an aerial message job using the received customer input and the received pilot input, wherein creating the aerial message job includes assigning at least one aerial message pilot to the aerial message job to create the aerial message at the requested aerial message job location;
receive, from the at least one aerial message pilot assigned to the aerial message job at the requested aerial message job location, aerial message job completion data, wherein the aerial message job completion data includes aerial message flight navigational data from the at least one aerial message pilot assigned to the aerial message job at the requested aerial message job location;
compare the aerial message flight navigational data to proposed navigation commands corresponding to a specific flight path for the at least one aerial message pilot to navigate in creating an aerial message text or graphic specified by the at least one aerial message job customer at the requested aerial message job location; and
when the aerial message flight navigational data corresponds to the proposed navigation commands within a first predetermined margin of error, determine that the aerial message job was executed by the at least one aerial message pilot assigned to the aerial message job at the requested aerial message job location in a compliant manner.

16. The non-transitory computer-readable storage medium of claim 15,
wherein the received customer input further includes: a requested aerial message job text or graphic; and a requested aerial message job time, and
wherein the received customer input further includes: a preset distance from the requested aerial message job location within which to solicit pilot bids for the aerial message job.

17. The non-transitory computer-readable storage medium of claim 15, wherein the instructions, when executed by one or more programmable processors of the computing device, further cause the one or more programmable processors to:
send an aerial message job bid solicitation to the at least one aerial message pilot assigned to the aerial message job, wherein the aerial message job bid solicitation includes: (i) at least one of the requested aerial message job location, a requested aerial message job time, and a requested aerial message job text or graphic to be written in the sky, and (ii) a cost estimate for the at least one aerial message pilot to execute the aerial message job at the requested aerial message job location; and
in response to sending the aerial message job bid solicitation, receive, from at least one aerial message pilot, an acceptance of the aerial message job bid solicitation.

\* \* \* \* \*